United States Patent [19]
Barlow et al.

[11] Patent Number: 5,367,697
[45] Date of Patent: Nov. 22, 1994

[54] MEANS FOR PROVIDING A GRACEFUL POWER SHUT-DOWN CAPABILITY IN A MULTIPROCESSOR SYSTEM HAVING CERTAIN PROCESSORS NOT INHERENTLY HAVING A POWER SHUT-DOWN CAPABILITY

[75] Inventors: George J. Barlow, Tewksbury, Mass.; James W. Keeley, Nashua, N.H.

[73] Assignee: Bull HN Information Systems Inc., Bilelrica, Mass.

[21] Appl. No.: 781,513

[22] Filed: Oct. 22, 1991

[51] Int. Cl.[5] .............................................. G06F 1/30
[52] U.S. Cl. .................................. 395/800; 395/575; 395/750; 364/228.9; 364/285.3; 364/264; 364/DIG. 1; 371/5.5; 371/9.1; 371/14
[58] Field of Search ........................ 395/425, 800, 575; 371/4, 5.5, 7, 9.1, 11.3, 14, 66, 68.3, 5.5, 9.1, 14

[56] References Cited

U.S. PATENT DOCUMENTS

| | | | |
|---|---|---|---|
| 4,260,854 | 4/1981 | Kolodny et al. | 379/75 |
| 4,914,576 | 4/1990 | Zelley et al. | 395/575 |
| 5,155,842 | 10/1992 | Kubin | 395/575 |

*Primary Examiner*—Alyssa H. Bowler
*Assistant Examiner*—John Follansbee
*Attorney, Agent, or Firm*—Lewis P. Elbinger; John S. Solakian

[57] ABSTRACT

A multiprocessor computer system includes first processors, second processors, a system management means for performing system management functions, including detecting pending power shut-downs and sending power shut-down messages addressed to each of the first processors warning of pending power shut-downs, and a system bus for communication between the first and second processors and the system management means, including the communication of pending power shut-down messages. The first processors include interrupt handling means responsive to pending power shut-down messages for executing power shut-down routines for placing the first processors into a known state before power termination, but the second processors inherently do not include a power shut-down capability. In each of the second processors, a power shut-down means is provided to place the second processors in a known state before a power termination, including a bus monitor connected from the system bus and responsive to any power shut-down message addressed to a first processor for generating an output indicating the occurrence of a power shut-down message to a first processor. The second processor also includes non-maskable interrupt logic connected from the power shut-down message output of the bus monitor and responsive to the power shut-down message output of the bus monitor for generating a non-maskable interrupt output to the second processor. The second processor is in turn responsive to a non-maskable interrupt output of the non-maskable logic for querying the non-maskable logic to determine the nature of the interrupt, and responsive to the indicated occurrence of a power shut-down message to any first processor for executing a power shut-down routine for placing the second processor in a known state before the termination of power.

3 Claims, 3 Drawing Sheets

MEANS FOR PROVIDING A GRACEFUL POWER SHUT-DOWN CAPABILITY IN A MULTIPROCESSOR SYSTEM HAVING CERTAIN PROCESSORS NOT INHERENTLY HAVING A POWER SHUT-DOWN CAPABILITY

CROSS REFERENCE TO RELATED APPLICATION

The present patent application is related to copending United Stats Patents Applications:

1. Method and Apparatus for Avoiding Processor Deadly Embrace in a Multiprocessor System, filed on Oct. 4, 1991, invented by Thomas F. Joyce and James W. Keeley, bearing Ser. No. 771,296, which is assigned to the same assignee as this patent application and issued Feb. 1, 1994 as U.S. Pat. No. 5,283,870.

2. Bus Interface State Machines, invented by James W. Keeley, filed on Oct. 4, 1991, bearing Ser. No. 771,712, which is assigned to the same assignee as this patent application.

3. R. A. LeMay, B. DiPlacido, M. M. Massucci and James W. Keeley, filed on Oct. 4, 1991, bearing Ser. No. 771,297, which is assigned to the same assignee as this patent application.

4. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986; continued as Ser. No. 547,527, filed Jun. 29, 1990, and again continues as Ser. No. 773,752, filed Oct. 10, 1991.

5. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

6. Apparatus and Method for Loading and Verifying A Control Store Memory of a Central Subsystem, invented by Chester M. Nibby, Jr., Richard C. Zelley, Kenneth E. Bruce George J. Barlow, and James W. Keeley, Ser. No. 943,984, filed Dec. 18, 1986 and issued Mar. 20, 1990 as U.S. Pat. No. 4,910,666.

7. Apparatus and Method of Loading Different Control Stores of a Multiprocessor to Provide a Multi-Personality System, Invented by Richard C. Zelley, Mark J. Kenna, Jr., and Wallace A. Martland, Ser. No. 943,985, filed Dec. 18, 1986, now abandoned.

8. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

9. System Management Apparatus for a Multiprocessor System, invented by George J. Barlow, Elmer W. Carroll, James W. Keeley, Wallace A. Martland, Victor M. Morganti, Arthur Peters and Richard C. Zelley, Ser. No. 869,164, filed May 30, 1986 and continued as Ser. No. 377,785, filed Jul. 6, 1989 and issued Dec. 28, 193, ad U.S. Pat. No. 5,274,797.

10. Memory System With Automatic Memory Reconfiguration, invented by Robert B. Johnson, Chester M. Nibby, Jr., and Edward R. Salas, Ser. No. 413,631, filed Sep. 3, 1982 and issued Mar. 26, 1985 as U.S. Pat. No. 4,507,730.

11. Memory Controllers With Burst Mode Capability, invented by Robert B. Johnson and Chester M. Nibby, Jr., Ser. No. 202,819, filed Oct. 31, 1980 and issued Dec. 28, 1982 as U.S. Pat. No. 4,366,539.

12. Resilient Bus System, invented by George J. Barlow and James W. Keeley, Ser. No. 717,201, filed Mar. 28, 1985 and issued Aug. 16, 1988 as U.S. Pat. No. 4,764,862.

13. Multiprocessor Shared Pipeline Cache Memory With Split Cycle and Concurrent Utilization, invented by James W. Keeley and Thomas F. Joyce, Ser. No. 655,473, filed Sep. 27, 1984 and issued Sep. 22, 1987 as U.S. Pat. No. 4,695,943.

14. Method and Apparatus for Resetting A Memory Upon Power Recovery, invented by Raymond Bowden III, Michelle A. Pence, George J. Barlow, Mark E. Sanfacon and Jeffery S. Somers, Ser. No. 593,917, filed Oct. 5, 1990, and issued Apr. 20, 1993 as U.S. Pat. No. 5,204,964.

15. Method and Apparatus for Performing Health Tests of Units of a Data Processing System, invented by George J. Barlow, Richard C. Zelley and James W. Keeley, Ser. No. 593,408, filed Oct. 5, 1990, and issued May 11, 1993 as U.S. Pat. No. 5,210,757.

16. Method and Apparatus for Memory Retry, invented by George J. Barlow, Raymond Bowden III and Michelle A. Pence, Ser. No. 593,182, filed Oct. 5, 1990 and issued May 11, 1993, as U.S. Pat. No. 5,210,867.

17. Method and Apparatus for Integrity Testing of Fault Monitoring Logic, invented by David Cushing, Edward Hutchins, Elmer W. Carroll and James Bertone, Ser. No. 771,702, filed Oct. 4, 1991.

18. Method and Apparatus for Adapting a Remote Communications Controller to a Variety of Types of Communications Modems, invented by R. C. Zelley, Ser. No. 629,745, filed Dec. 18, 1990, and issued Apr. 13, 1993, as U.S. Pat. No. 5,202,963.

BACKGROUND OF THE INVENTION

1. Field of Use

The present invention relates to the cooperative operation of different types of processors as a single system and, more particularly, to a means for adding graceful power failure degradation capability to a system comprised of different processors.

2. Prior Art

A recurring problem in present computer systems arises from the need to combine various types of processor units into a single system to allow the system of perform a wider range of operations than may be achieved through a system using a single type of processor or to increase the performance of the system by adding faster and more powerful processors or processors providing special capabilities.

This need may arise, for example, from a requirement to provide a system which is capable of operating with both the application programs and user data files created for an installed, proprietal system and the new "industry standard", or "open system", operating systems and application programs. Such hybrid systems are becoming more common as the need increases in the computer industry to provide systems which allow a user which has a very large installed proprietary system base to "migrate" over time to the presently proposed "open systems" which use "industry standard" hardware and one of the "industry standard" operating systems. An example of such would be the combination of one of the present "industry standard" processor units, such as an Intel[1]80486[2] microprocessor running the UNIX[3] operating system and compatible applications programs, into a system based upon a proprietary operating system and hardware, such as the DPS 6000[4] computer system available from Bull HN Information Systems Inc., which runs applications programs designed for the proprietary system.

It is also well know, and a major problem in communication between processors, that different types of processors frequently recognize and use different types, numbers and levels of interrupts, have different communications capabilities, and have different method for handling such operations as graceful shut-down upon power failure. In fact, some processors and operating systems, such as UNIX do not provide a dynamic power failure capability.

It is therefore an object of the present invention to provide a solution to this and other related problems in providing a graceful power shut-down capability in a system comprised of different types of processors and operating systems wherein certain of the processors

[1]Intel is a trademark of Intel Corporation.
[2]i486 is a trademark of Intel Corporation.
[3]UNIX is a trademark of UNIX System Laboratories Inc.
[4]DPS and DPS6000 are trademarks of Bull HN Information Systems Inc. do not have an inherent dynamic power failure capability while other have such a capability.

SUMMARY OF THE INVENTION

The present invention provides a multiprocessor computer system including first processors, second processors, a system management means for performing system management functions, including detecting pending power shut-downs and sending power shut-down messages addressed to each of the first processors warning of pending power shut-downs, and a system bus for communication between the first and second processors and the system management means, including the communication of pending power shut-down messages.

The first processors include interrupt handling means responsive to pending power shut-down messages for executing power shut-down routines for placing the first processors into a known state before power termination, but the second processors inherently do not include a power shut-down capability.

The present invention provides, in each of the second processors, a power shut-down means to place the second processors in a known state before a power termination, including a bus monitor connected from the system bus and responsive to any power shut-down message addressed to a first processor for generating an output indicating the occurrence of a power shut-down message to a first processor. The second processor also includes non-maskable interrupt logic connected from the power shut-down message output of the bus monitor and responsive to the power shut-down message output of the bus monitor for generating a non-maskable interrupt output to the second processor. The second processor is in turn responsive to a non-maskable interrupt output of the non-maskable logic for querying the non-maskable logic to determine the nature of the interrupt, and responsive to the indicated occurrence of a power shut-down message to any first processor for executing a power shut-down routine for placing the second processor in a known state before the termination of power.

The foregoing and other objects, features and advantages of the present invention will be apparent from the following description of the invention and embodiments thereof, as illustrated in the accompanying figures, wherein:

DESCRIPTION OF PREFERRED EMBODIMENTS

Figure 1:
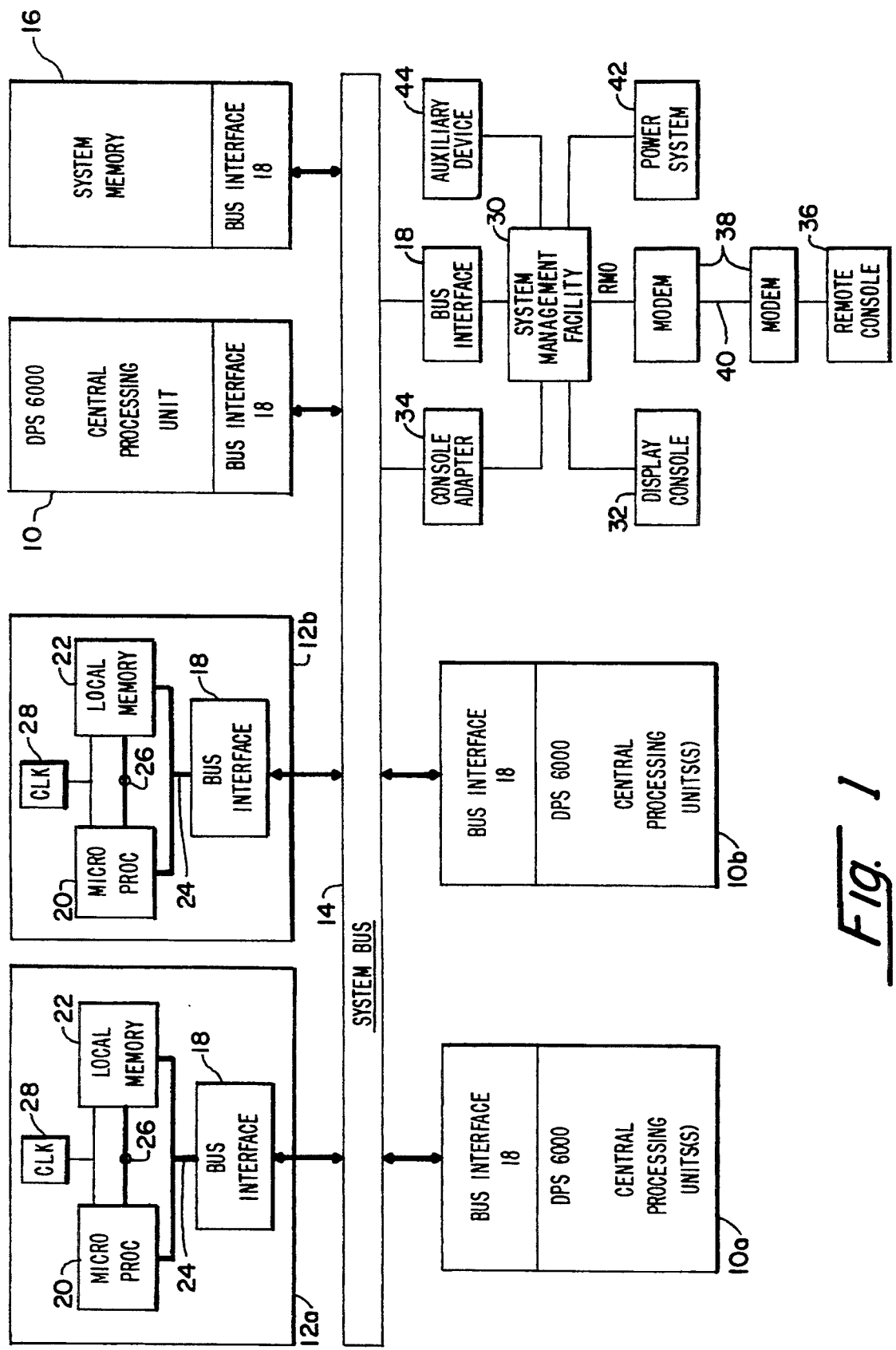
FIG. 1 is a block diagram of a computer system incorporating the present invention; and, FIG. 2 is a block diagram of a system manager of the system illustrated in FIG. 1; and, FIG. 3 is a block diagram of the means for providing a graceful power failure capability to a processor which does not have such a capability inherently.

Referring to FIG. 1, therein is shown a multiprocessor computer system which includes a plurality of Central Processing Units 10a through 10x and peer Processors 12a and 12b which tightly couple in common to a System Bus 14 and to a Main, or System, Memory 16. Each Processor 10 and 12, which are also referred to herein has, respectively, "first" and "second" processors, includes a Bus Interface 18 which enables the unit to transmit or receive requests in the form of commands, interrupts, data or responses/status to another unit on System Bus 14. In the preferred embodiment, System Bus 14 operates asynchronously and uses a split bus cycle protocol which provides higher performance by granting other units bus cycles during the period of time a unit is waiting for main memory to furnish data in response to an earlier request made by that unit. In the present implementation, System Bus 14 is, for example, a MEGABUS[5] asynchronous system bus and, for further information regarding this

[5]MEGABUS is a traderark of Bull HN Information Systems Inc. type of bus interface and operation, reference may be made to U.S. Pat. No. 3,997,896.

Referring to FIG. 1, it is seen that each peer Processor 12 includes a Microprocessor 20, a Local Memory 22 for storing data to be operated upon and program routines for controlling operations of Microprocessor 20, including interrupt handling routines, and Interface Buses 24 which couple to Bus Interface circuits 18, as shown. Microprocessor 20 and Local Memory 22 are tightly coupled through a Local Processor Bus 26 and operate under control of clock inputs provided by a Clock Circuit (CLK) 28.

Microprocessor 20 is a high performance 32-bit processor which operates at clock speeds of up to 33 MHz and in the preferred embodiment corresponds to an Intel 80486 chip. The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12 operate under the control of a UNIX operating system.

Central Processing Units 10 function as host processors and, in the preferred embodiment, each processor takes the form of a Bull DPS6000 system which operates under the control of the Bull HVS proprietary operating system. Each of the processors are organized to operate in an independent manner and have access to the full complement of system resources, such as input/output units, main memory and the like. As described in the referenced patents, which are incorporated herein by reference, each Processor 10 includes a processor unit for performing operations on data, a local memory for storing data to be operated upon and program routines for controlling operations of processor unit, including interrupt handling routines Finally, the functional units of the system of FIG. 1 include a System Management Facility (SMF) 30 with associated system management devices. SMF 30 provides centralized control of the system. Among the operations controlled by SMF 30 are initialization of the system, initialization and control of system logic and circuitry testing, that is, system fault testing and detection, and loading of operating system and applications software into System Memory 16 and Processors 10 and 12. SMF 30 also controls certain overall system operations, including system timing, monitoring of errors and faults, and monitoring of system operating temperature and system power.

Associated with SMF 30 are a Display Console 32 connected to SMF 30, which allows direct communication between a user and the system, and a Console Adapter 34 which provides communication between Display Console 32 and System Bus 14 through SMF 30. Communication between a remote user, for example, using a Remote Console 36, is provided through a variety of communications links, such as phone lines, which are connected to SMF 30 through Medems 38 and Communications Links 40. Medems 38 and Communications Links 40 generally allow communications between the system and other, external devices, such as remote systems and remote diagnostic facilities. Finally, SMF 30 includes a power sensor connection to Power System 42, which provides power to all units of the system, and connections to such Auxiliary Devices 44 as a printer.

Next considering System Bus 14 operations, the Bus Interfaces 18 of the various units of the system are responsible for controlling the bus operations for all units of the system, including Processors 10 and 12 and SMF 30. SMF 30 has access, through the Bus Interfaces 18 and System Bus 14, to many of the individual registers of the units of the system, again including Processors 10 and 12, and may read and write individual registers in the system units.

Briefly considering the bus operations executed by the units of the system, as was previously described, the various units of the system, such as SMF 30 and Processors 10 and 12, may communicate through System Bus 14 by executing the protocols for bus transfer operations described in the previously referenced related patents. The various signals used in the bus transfer operations include address and data fields, for communicating, for example, the identity of a system unit with which is the recipient of a bus request, the address of a memory location or register within the unit which is to be read or written to, fields indicating the type of operation to be performed, for example, a read or write operation, and various control and handshake signals.

Each bus operation is executed in a single phase. The system unit initiating the operation, referred to as the master unit for the operation, asserts a request for a bus transfer operation by placing control, handshake and address signals on the appropriate lines of System Bus 14, to initiate the operation, while simultaneously placing the data to be transferred on the data lines of System Bus 14. The control, handshake and address signals include signals indicating the type of operation to be performed, the identity of t2e system unit which is the target of the request, and the address of the location within the system unit which is the target, or recipient of the request, referred to as the slave unit for the operation. The slave unit then responds to the request by either accepting the request and the data or by refusing the request, for example, by refusing to acknowledge the request, by asking the master unit to wait, or by simply not responding.

If the operation requires a response from the target system unit, for example, when a Processor 10 or 12 requests a read of data from a System Memory 16, the target of the initial request will in turn initiate a subsequent bus transfer operation in response to the initial bus operation, but with the original target unit now being the master unit for the bus operation and the original master unit being the target unit.

Figure 2:
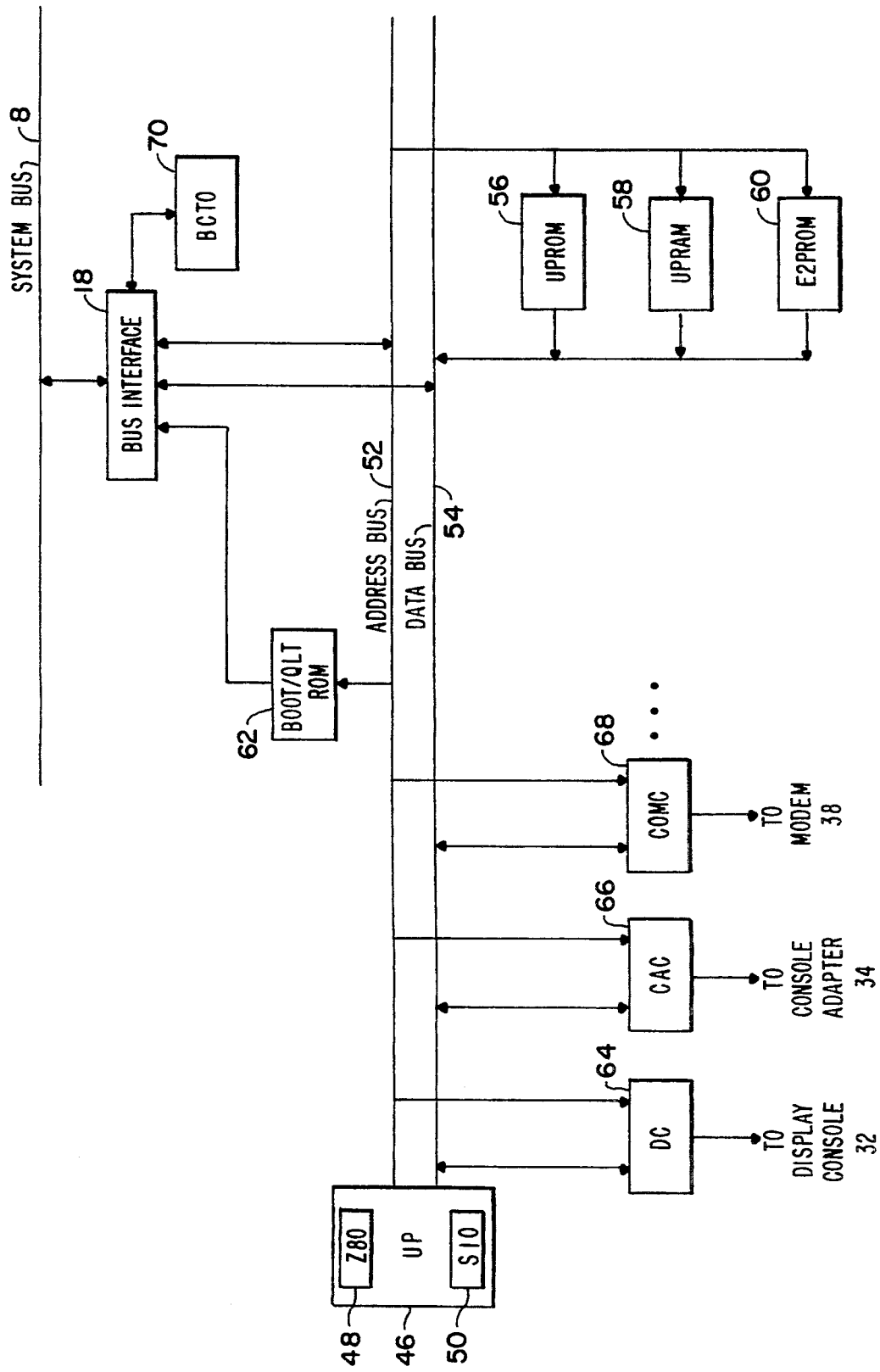

It should be noted, with respect to bus operations, that the Bus Interfaces 18 also includes bus access arbitration logic which, when presented with conflicting requests for bus operations from two or more system units, resolves the requests to grant access to the requesting unit having the highest assigned priority Referring to FIG. 2, therein is presented a simplified block diagram of SMF 30. As shown, SMF 30 is essentially a general purpose central processing unit executing programs designed to perform specialized functions. Among these functions are system initialization and test, including the initial loading of microcode routines into the processors and the loading of test programs into System Memory 16 and the execution of such test programs to test the proper operation of the system and detect errors or faults in the operations of the units of the system. SMF 30 also controls communications between the system and other systems or facilities.

SMF 30 includes a Microprocessor Unit (UPU) 46, which controls and performs the operations of SMF 30 under direction of programs stored in SMF 30's memory units. In addition to other operational units, SMF 30 includes a Microprocessor 48 (UP 48), such as a Z80 microprocessor, and a Ser.Input/Output Handler 50 (SIO 50).

As will be discussed further and as is well understood by those of ordinary skill in the art, UP 48 executes the actual data and control operations of UPU 46 while SIO 50 operates as an input/output device for UP 48, in particular with respect to interrupt inputs to UP 48.

An Address Bus 52 and a Data Bus 54 connects UPU 46 and the other units of SMF 30 for communication of data and instructions among the unit of SMF 30.

The memory units of SMF 30 include a Microprocessor Read Only Memory (UPROM) 56, which stores the programs directly controlling UPU 46, that is, UPU 46's microcode routines. Data used by and generated SMF 30 and certain programs controlling the operations of SMF 30 are stored in a Microprocessor Random Access Memory (UPRAM) 58, as is typical in most computer systems.

An Electronically Erasable Programmable Read Only Memory (E2PROM) 60 is provided for long term storage of certain programs and information which are to be permanently resident in SMF 30, unless deliberately erased or overwritten by the system user. Such programs would include the initialization program, or bootload program, for SMF 30, passwords and password programs for controlling access to the system and SMF 30, information identifying the system peripheral devices storing the system initialization (boot) software, System Memory 16 locations assigned for specific functions, such as storing boot and test programs, information as to which test programs are to be executed and the results to be expected from such programs, and routines for controlling power shut-down warning messages to other units of the system, such as Processors 10, when SMF 30's Power System 42 sensors detect a pending power failure or shut-down.

E2PROM 60 will also store and provide test programs for the self test of SMF 30, the testing of System Bus 14, and testing of various device's interfaces with System Bus 14. The test programs also include programs for testing internal units of, for example, the Processors 12.

Finally, a Boot and QLT (Quality Logic Test) Read Only Memory (BOOT/QLT ROM) 62 is provided to store programs for controlling operation of the system during initialization, such as a programs for controlling the initial loading, or booting, of software into the system and for selecting test programs to be executed at system initialization.

SMF 30 also includes a number of device controllers for controlling the peripheral devices of SMF 30, such as a Display Controller (DC) 64 for interfacing SMF 30 with Display Console 32, a Console Adapter Controller (CAC) 66 for interfacing SMF 30 to Console Adapter 34, and a Communications Controller (COMC) 68 for interfacing SMF 30 with Modem 38.

Finally, the units of SMF 30 are connected, through A Bus 64 and D Bus 66, to System Bus 14 through a Bus Interface 18. BOOT/QLT ROM 62 which, as described, stores programs for controlling the initialization and testing of other units of the system, such as the processors and System Memory 16, is connected directly through Bus Interface 18 to System Bus 14, as is Bus Control Time Out 70 (BCTO 70), which monitors System Bus 14 operations to detect failed operations, that is, requests for bus transfer operations wherein the target unit has not responded to a bus request within the allowed time-out period.

SMF 30 will not be described in further detail as the general structure and operation of such units in a system, are, in general, well known in the art and are described in detail in the referenced related patents.

As described in the above referenced patents, which are incorporated herein by reference, one function of SMF 30 is to monitor the state and pending state of power to the elements of the system through SMF 30's power sensor connections to Power System 42. If SMF 30 detects an impending power failure or shut-down, SMF 30 will transmit, to each Processor 10 in the system individually and through System Bus 14, a message that a power shut-down is pending. Each Processor 10, which are referred to in other parts of this description as the "first" processors and which, as described in the referenced and incorporated patents, have a built-in power shut-dow capability as a part of their design, will receive the power failure warning message addressed to itself, and will respond with an Acknowledge (ACK) message to SMF 30. Each Processor 10 will then execute its power shut-down routine to place the Processor 10 in a known state in preparation for the power shut-down, such as storing all Processor 10 operating state and data.

As was described, however, the Processors 12 of the system do not have an inherent power shut-down capability. Shown in FIG. 3 is the circuitry added to Processors 12 to add this capability to these processors, otherwise referred to herein as "second" processors.

Figure 3:
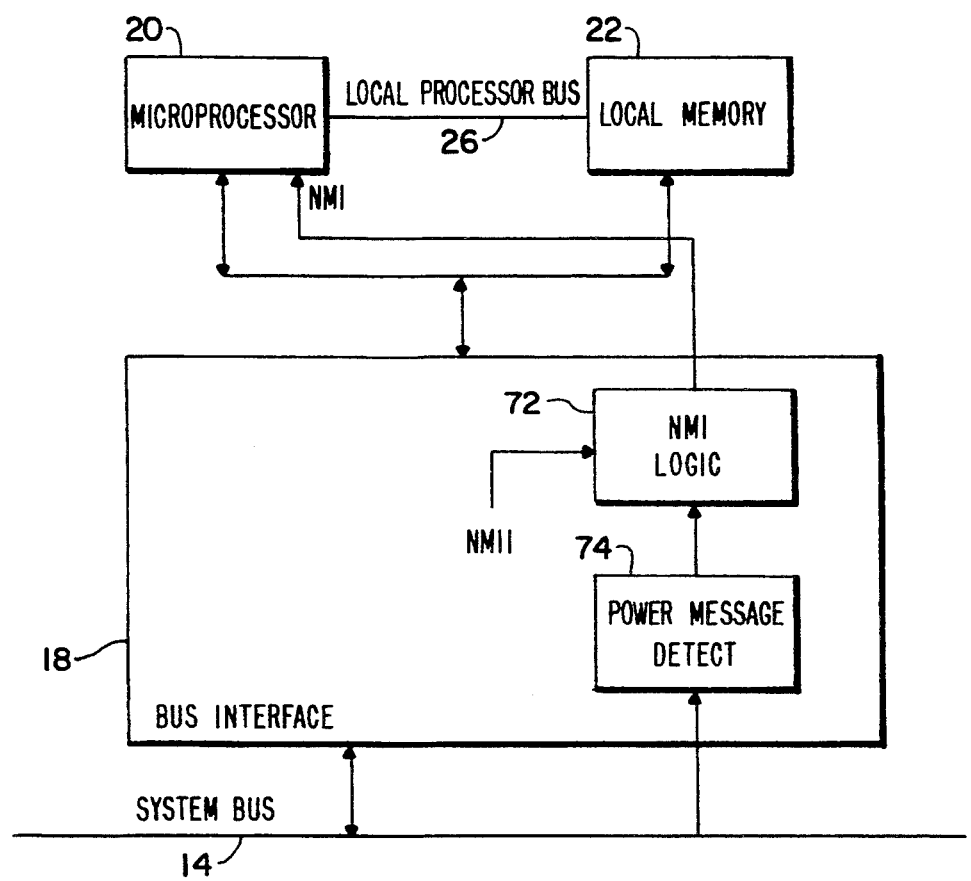

Referring to FIG. 3, which is a block diagram of a "second" processor, that is, a Processor 12, Bus Interface 18 is shown as including Non-Maskable Interrupt Logic (NMI Logic) 72, which receives Non-Maskable Interrupt Inputs (NMII), such as SMF 30 watch-dog timer time-out, parity error, bus lock-up, and so forth, from SMF 30 and other units of the system, usually through System Bus 14. NMI Logic 72 is responsive to such non-maskable interrupt inputs to provide a Non-Maskable Interrupt (NMI) input to Processor 20, which responds by querying NMI Logic 72 as to the nature of any non-maskable interrupt that has occurred and executes a corresponding interrupt handling routine.

As has been described, these second processors, that is, Processors 12, do not have an inherent power shut-down capability and accordingly may not receive messages warning of pending power shutdowns from SMF 30 as may the first processors, that is, Processors 10.

Accordingly, a Power Message Detect Logic 74 having inputs connected from the address and data lines of System Bus 14 and a non-maskable interrupt output to NMI Logic 72 has been added to the Bus Interface 18 of the second processors. Power Message Detect Logic 74 monitor each bus cycle on System Bus 14 for the particular combination of bits that indicates a power failure warning message to any one or more of the first processors, that is, to any one of Processors 10, and generates a non-maskable interrupt output to NMI Logic 72 if Power Message Detect Logic 74 detects any power failure warning message to any of the first processors.

NMI Logic 72 will then generate a corresponding NMI output to the Microprocessor 20, which will in turn query NMI Logic 72 as to the type of interrupt and, upon indication that a power failure warning has appeared on System Bus 14, will execute a corresponding power shut-down routine to place the Processor 12 in a known state before power is terminated.

In addition to providing these second processors with a graceful power shut-down capability, this capability also insure that the second processors will execute a power shut-down routine at the time that the first processors are also attempting to execute their power shut-down routines. The second processors will be terminating any use of the resources of the system as part of the power shut-down routine, so that the first processors will have access to the system resources, such as System Memory 16 and the peripheral devices, such as disk drives, to successfully execute their own power shut-down routines.

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A multiprocessor computer system, comprising:
   first processors having a first kind of interrupt handling means,
   second processors having a second kind of interrupt handling means,
   said first and second kind interrupt handling means being different,
   a system management means for performing system management functions, including detecting pending power shut-downs and sending pending power shut-down messages directed to each of the first processors warning of pending power shut-downs, a system bus for communication between the first and second processors and the system management means, including the communication of pending power shut-down messages, the first processors first kind interrupt handling means responsive to pending power shut-down messages for executing power shut-down routines for placing the first processors in a known state before power termination, said second processors second kind interrupt handling means not recognizing and responding to said pending power shut-down messages; and a power shut-down means in each of said second processors for responding to said pending power shut-down messagess to control said second kind interrupt handling means to place the second processors in a known state before a power termination, including a bus monitor connected to the system bus and responsive to any pending power shut-down message directed to a first processor for generating an output signal indicating the occurrence of a pending power shut-down message directed to a first processor, non-maskable interrupt logic coupled to the bus monitor and responsive to the generation of said output signal for generating a non-maskable interrupt output signal, the second processor being responsive to the generation of a non-maskable interrupt output signal for querying the non-maskable interrupt logic to determine the nature of the interrupt, and responsive to the detection of a pending power shut-down message directed to any first processor for executing a power shut-down routine for placing the second processor in a known state before the termination of power.

2. A data processing system for providing orderly shut-down of a plurality of data processors operating in said system, said system being of the type wherein said data processors are coupled to a system bus, which bus provides a path for information communication between any two of said processors; comprising:

means for transmitting on said bus a message denoting that system power shut-down is imminent;

at least one first-type processor, said first-type processor having a first kind of interrupt handling means for monitoring communications transmitted on said bus and responding to said message to initiate execution of a routine for placing said first-type processor into a predetermined state prior to the power shut-down; and at least one second-type processor, said second type processor having a second kind of interrupt handling means different from said first kind of interrupt handling means, said second kind of interrupt handling means not recognizing and responding to said message;

apparatus coupled to each of said second type processors comprising:

a bus monitor coupled to said bus for monitoring communications transmitted on said bus and responsive to the transmission of said message on said bus for generating an output signal; and a logic unit coupled to said bus monitor and responsive to said output signal for generating an interrupt signal;

whereby said second-type processor responds to said interrupt signal to initiate execution of a routine for placing said second-type processor into a predetermined state prior to the power shut-down.

3. The system of claim 2, wherein;

said second-type processor:

queries said logic unit in response to said interrupt signal to determine the kind of event that caused the generation of said interrupt signals; and, initiates execution of said routine when said event is determined to be the detection by said bus monitor of said message.

* * * * *